United States Patent [19]

Brunson

[11] 4,281,928
[45] Aug. 4, 1981

[54] OPTICAL TRANSIT SQUARE WITH FOCUSABLE CROSSING TELESCOPES

[75] Inventor: Amber N. Brunson, Kansas City, Mo.

[73] Assignee: Brunson Instrument Company, Kansas City, Mo.

[21] Appl. No.: 99,616

[22] Filed: Dec. 3, 1979

[51] Int. Cl.³ .............................................. G01C 1/00
[52] U.S. Cl. ..................................... 356/140; 350/32; 33/276
[58] Field of Search ............... 356/138, 140, 144, 146, 356/147; 350/31, 32; 33/276, 278, 279, 280

[56] References Cited

U.S. PATENT DOCUMENTS

| | | | |
|---|---|---|---|
| 933,897 | 9/1909 | Ferber | 33/280 |
| 974,007 | 10/1910 | Wolcott | 33/280 |
| 1,215,317 | 2/1917 | Chambre | 33/280 |
| 3,290,784 | 12/1966 | Goff et al. | 33/276 |

*Primary Examiner*—R. A. Rosenberger
*Attorney, Agent, or Firm*—Fishburn, Gold and Litman

[57] ABSTRACT

A precision optical square instrument for use in optical tooling to accurately determine lines and planes at right angles to each other, such as horizontal and vertical lines and planes. The instrument employs focusable telescopes mounted at right angles to each other and supported between spaced arms of a standard rotatably mounted on a spindle connected to a base, such as for rotation about a vertical axis. The standard has opposed arms with trunnions therein supporting a first telescope for rotation about an axis, such as horizontal, for creating a first plane of view and positioned perpendicularly of the axis of rotation of the standard about the spindle. The optical axis of a second telescope perpendicularly crosses the optical axis of the first telescope at the juncture of rotative axis of the spindle with the first telescope and is rotatable orthogonally to the optical axis of the first telescope for creating a second plane of view perpendicular to the first plane. Both telescopes have focusing capability and include objective lenses, eyepiece lenses, erector lenses, adjustable focusing lenses, and reticles. Use of the instrument permits a technician to set the spindle of the standard perpendicular to any object by alignment with at least two known points by use of either or both of the telescopes in coordination. In many applications, the present instrument obviates the necessity for a second optical tooling instrument and operator.

11 Claims, 12 Drawing Figures

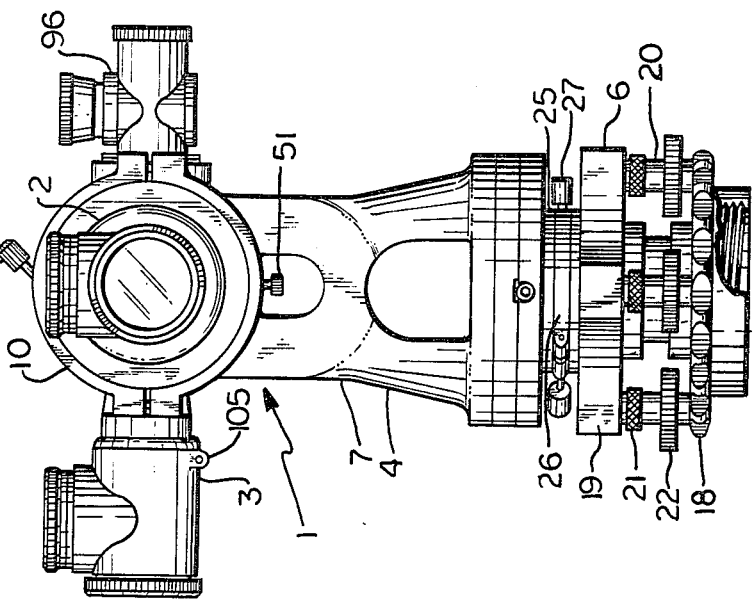
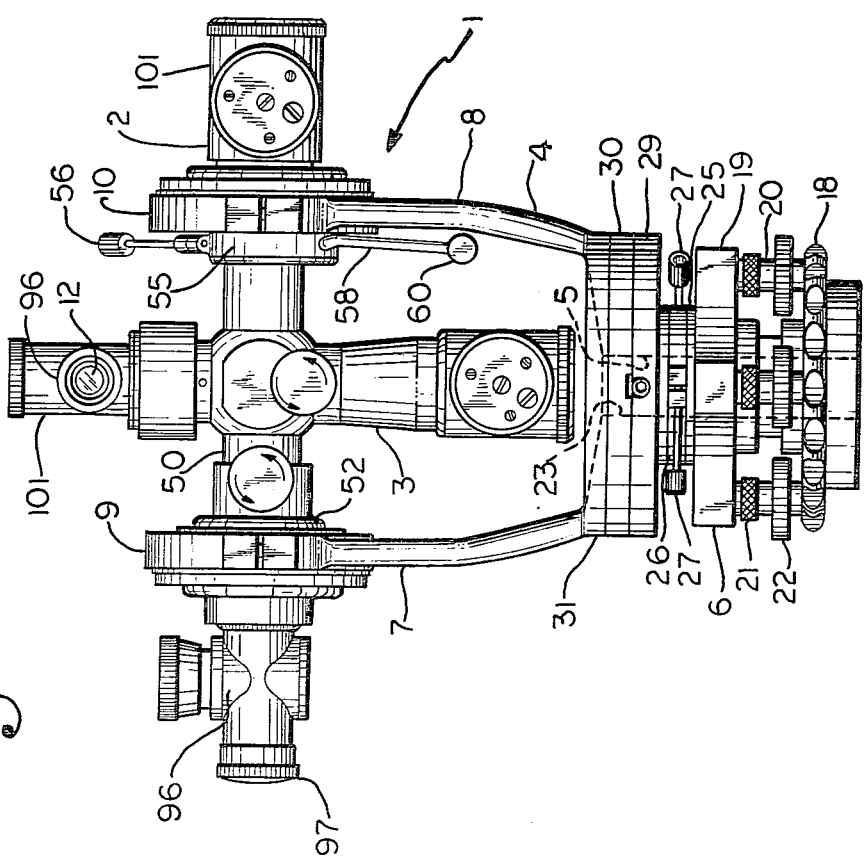

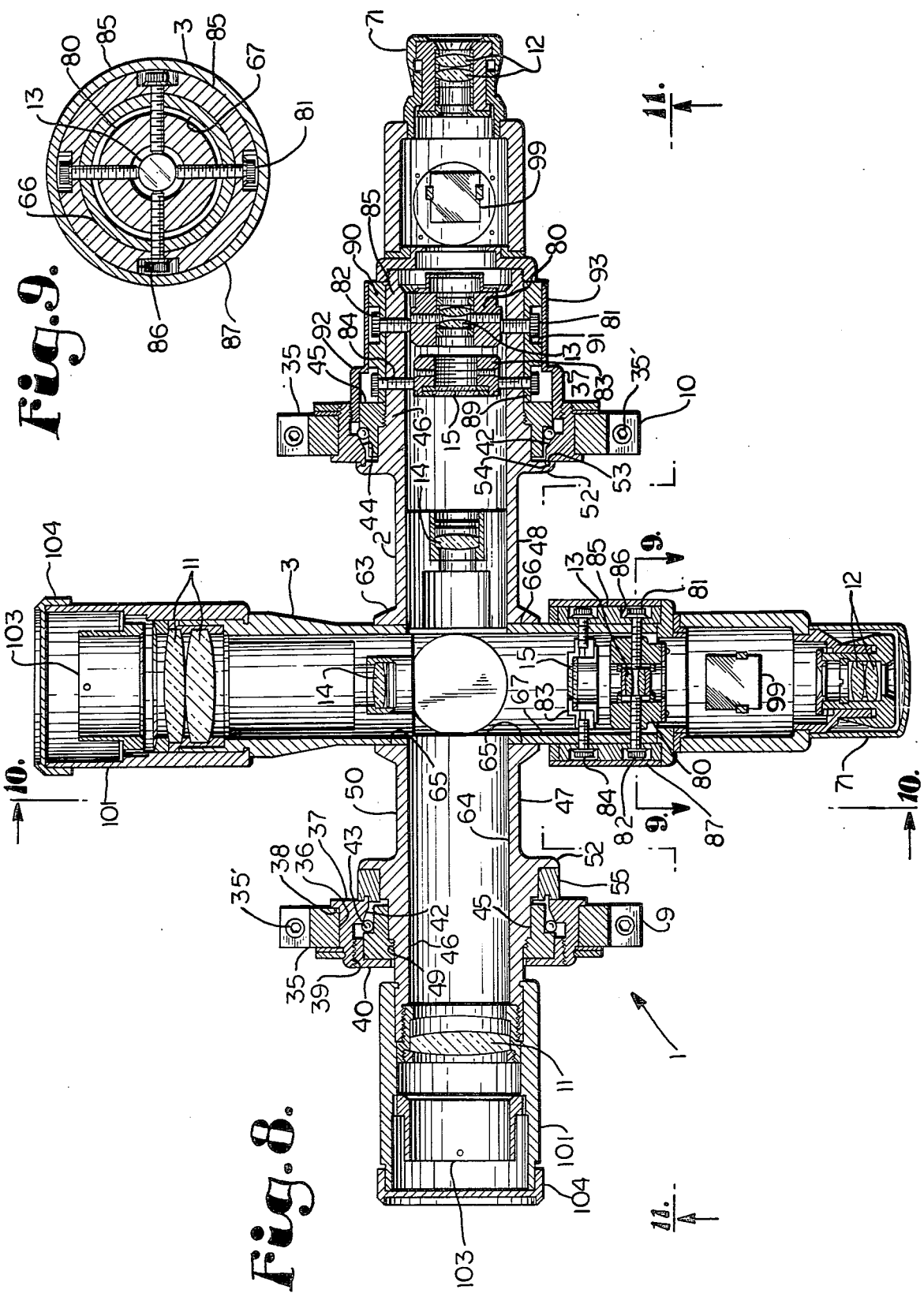

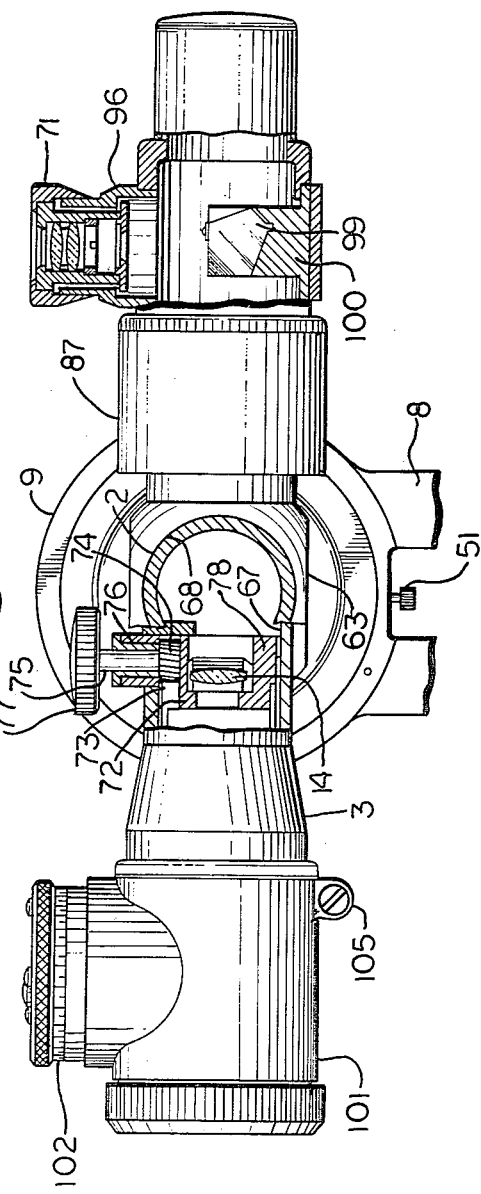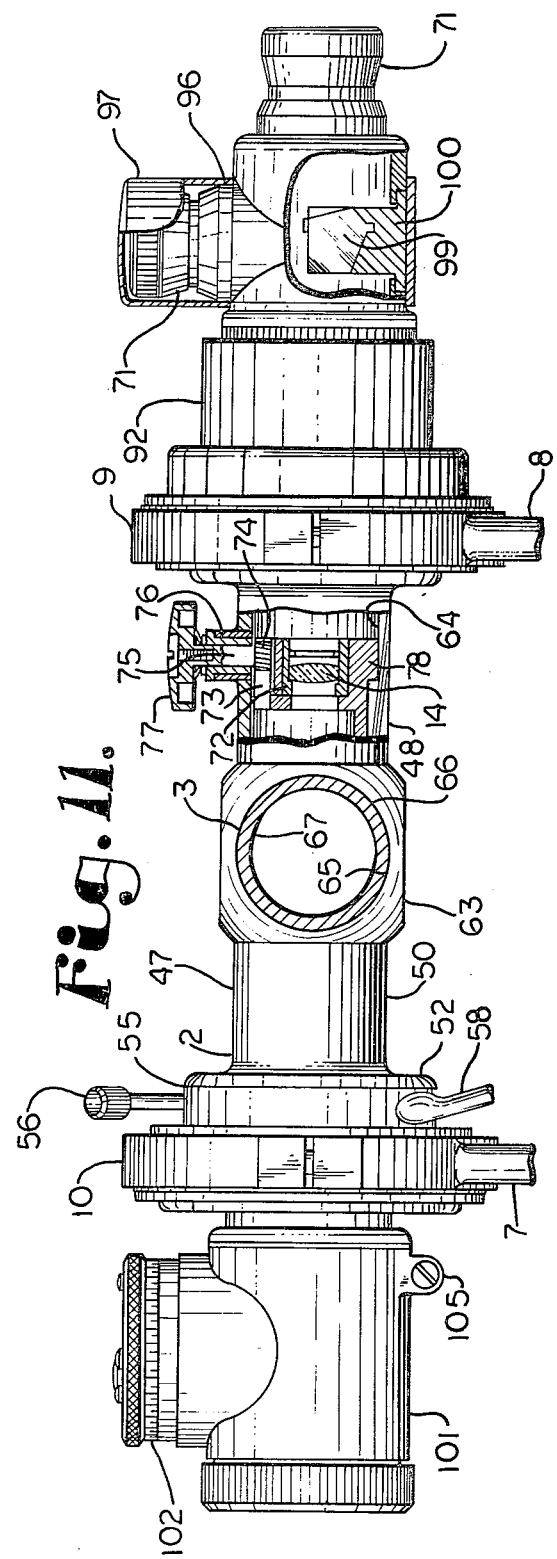

OPTICAL TRANSIT SQUARE WITH FOCUSABLE CROSSING TELESCOPES

This invention relates to instruments for optical alignment, and more particularly, to such instruments which are made with precision for use in optical tooling.

In the layout, positioning and alignment of portions of large structures such as ships, aircraft, buildings, ocean-going drilling platforms, production mills and the like, and making accurate measurements in connection with such large structures, it is very difficult to make the necessary measurements by linear measuring devices, and even more difficult to project the measurements into the complex substructures of the aforementioned structures whereby critical points or positions can be located with desired precision.

Various instruments for use in optical tooling are known in the art and used to establish an optical reference line parallel to one axis of the object being worked upon and then establish optical planes at right angles to the basic reference line. Known optical tooling instruments often require the use of multiple operators and instruments for verification and calibration purposes to insure that a particular "shot" or line of sight remains in a plane parallel to the reference line or plane. Such verification procedures are time consuming, particularly when the work requires the location of a large number of critical points.

The principle objects of the present invention are: to provide an instrument having the ability to sweep a plane parallel to another plane without first defining the orientation of the first plane to gravity; to provide such an instrument having the ability to sweep a plane, and focus upon points therein, which is parallel to a reference plane or first plane without first defining the orientation of the first plane to gravity; to provide such an instrument having the ability to sweep a predetermined plane without first defining the orientation of the predetermined plane to gravity; to provide such an instrument having the ability to sweep a plane perpendicular or parallel to a plane or line without first defining the orientation of the plane or line to gravity; to provide such an instrument having crossing telescopes with a common intersection of the optical axes thereof and which are focusable upon objects or points within the respective fields of view thereof; to provide such an instrument which may be oriented to planes or lines either aligned, parallel or perpendicular to each other by the use of targets within the planes or lines; to provide such an instrument having focusable telescopes at right angles to each other and able to sweep points in a conical area; to provide such an instrument for establishing a reference line parallel to, co-planar with or co-linear with one axis of an object being worked upon; to provide such an instrument whereby the telescopes are capable of auto-reflection and auto-collimation; to provide such an instrument having an axis and spindle mounting of standard supporting the telescopes characterized by accurate and precise operation; to provide such an instrument with a telescope having a source of light which is directed into the barrel behind a reticle containing internal cross hairs, filar lines and the like and a reflecting mirror for projecting the image of the cross wires to other optical transit square instruments or the workpiece for alignment and location of operations; and to provide optical tooling instruments of the character described that can be quickly and easily adjusted for accurate alignment and positioning, checked and utilized for extreme precision and consistency in close measurement and extreme accuracy in the locating of planes and points for more precision as well as speed in the construction and setting up of complex structures.

Other objects and advantages of this invention will become apparent from the following description taken in connection with the accompanying drawings wherein is set forth by way of illustration and example, a certain embodiment of this invention.

FIG. 6 is an elevational view of the instrument with the telescopes thereof shown in the positions illustrated in FIG. 5.

FIG. 7 is an elevational end view of the instrument taken from a right hand side of FIG. 1.

FIG. 8 is a sectional view of the instrument taken substantially on the axes of the two telescopes.

FIG. 9 is a sectional view taken along lines 9—9, FIG. 8 and showing reticle adjustment means.

FIG. 10 is a sectional view taken along lines 10—10, FIG. 8.

FIG. 11 is a sectional view taken along lines 11—11, FIG. 8.

FIG. 12 is an enlarged, fragmentary view showing an elevational adjustment means between a telescope and the standard.

Figure 1:
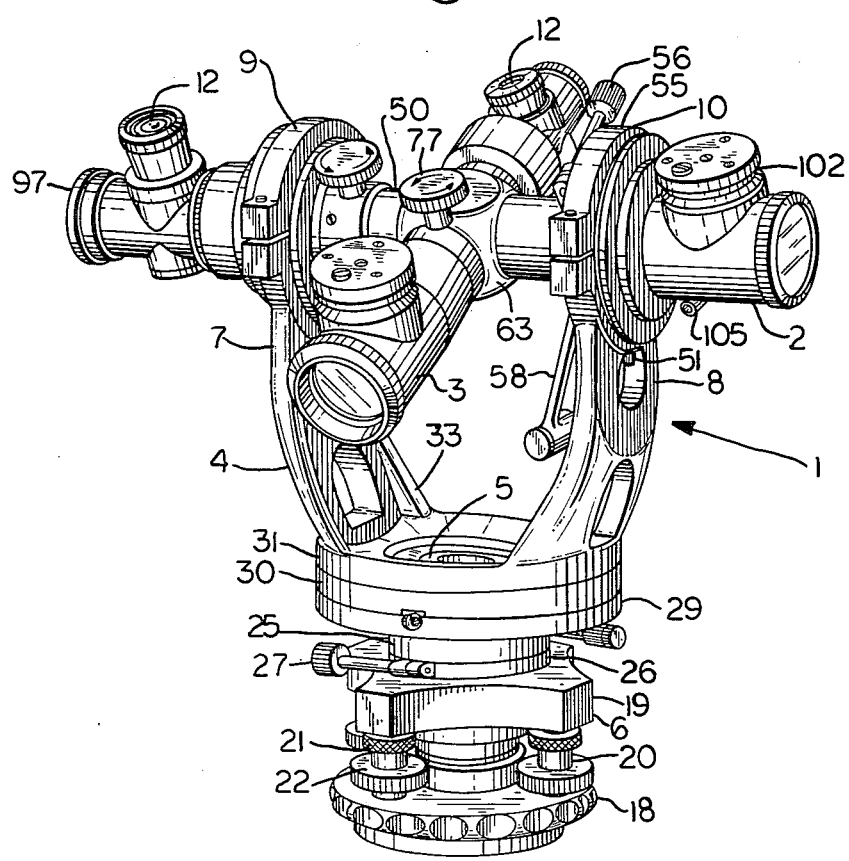
FIG. 1 is a perspective view of the optical transit square instrument with focusable cross telescopes embodying this invention.

As required, a detailed embodiment of the present invention is disclosed herein, however, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Referring more in detail to the drawings:

The reference numeral 1 generally indicates a precision optical transit square instrument for optical tooling for use in accurately determining lines and planes oriented horizontally and vertically. The instrument employs a main or first telescope 2 and a cross telescope 3 which are mounted at right angles to each other and have intersecting optical axes. The telescopes 2 and 3 are supported by a standard 4 rotatable about a spindle 5 and a base 6 for receiving and centering structure for supporting the transit square instrument 1. The standard 4 has opposed arms 7 and 8 with respective trunnions 9 and 10 therein supporting the main or first telescope 2 for rotation about a first axis and positioned perpendicularly of a second axis about which the standard 4 rotates.

The second or cross telescope 3 intersects the optical axis of the main telescope 2 perpendicularly and in line with the axis of rotation of the standard 4 about the spindle 5 whereby the cross telescope 3 is rotatable both in the plane of rotation of the first telescope and rotatable in a plane perpendicular to a plane swept by the first telescope 2 during rotation of the standard 4 about the spindle 5.

For purposes of simplicity of illustration and example, the transit square instrument 1 is oriented with the spindle 5 vertical so that the main telescope 2, during rotation of the standard 4 about the spindle 5 sweeps a horizontal plane and is able to focus upon points or locations in the horizontal plane. Accordingly, the cross telescope is also able to sweep a horizontal plane and, by rotating the main telescope 2 about its optical axis through the trunnions 9 and 10, is able to sweep a vertical plane and focus upon points or locations in the vertical plane. However, it will be understood that the base 6 may be positioned so that the spindle 5 does not have a vertical orientation and, in which case, the orientation of the planes defined by rotation and/or sweeping of the main and cross telescopes 2 and 3 will accordingly differ from the situation described above.

Both telescopes 2 and 3 are focusable and include objective lenses 11, eyepiece lenses 12, erector lenses 13, adjustable focusing lenses 14 and reticles 15. Use of the transit square 1 permits a technician to set the spindle 4 at right angles to any object by the use of at least two known points in line, together or individually, with either or both of the telescopes 2 and 3 and in many applications, obviates the necessity of a second optical tooling instrument and operator.

In the illustrated example, the base 6 for the optical transit square instrument includes a foot plate 18 on which a leveling head 19 is supported by a plurality of screws 20 providing a level adjustment between the leveling head 19 and the foot plate 18. The screws 20 include a coarse adjustment knob 21 and a fine adjustment knob 22. The leveling head 19 has bores therein (not shown) accomodating the central spindle 5 which extends straight vertically upward and provides relative rotation of the standard 4 on the leveling head 19 and foot plate 18 about a vertical axis coaxial with the spindle 5. The exemplary spindle 5 has a coaxial bore 23 therethrough which is open for sighting.

A collar 25 is sleeved on an upper portion of the spindle 5 and has a clamp ring 26 including spaced, opposite clamp screw assembles 27 for drawing the clamp ring 26 tightly around the spindle 5 and controlling free rotation of the standard 4 about the base 6.

The spindle 5 has an upper end connected to a lower plate 29 which rotates with the collar 25. An intermediate plate 30 is mounted on the upper surface of the lower plate 29 and a ring member 31 is mounted on the upper surface of the intermediate plate 30 whereby the ring member 31 constitutes the base portion of the standard 4. Suitable fasteners (not shown) extend through the plates 29 and 30 and into the ring member 31 whereby the ring member 31 is rigidly secured thereto. Screws connect the ring member 31 to the intermediate plate 30 and permit relative lateral movement and adjustment of the intermediate plate 30 relative to the plate 29 when the screws are loose.

In the illustrated example, the standard 4 is of an open structure for lightness of weight and the arms 7 and 8 thereof are arcuate in horizontal cross section with the side edges sloping outwardly whereby the lower portions of the opposite arms 7 and 8 are connected as at 33 to form a rib above the ring member 31. The shape of the standard 4 and the arms 7 and 8 thereof is such that variations in temperatures cannot twist or warp the structure and the standard 4, upon expansion and contraction, will maintain itself in suitable alignment to accurately support the telescopes 2 and 3.

The trunnions 9 and 10 are carried on the upper ends of the respective arms 7 and 8 and include split bearing members having bores 36 therein for receiving sleeves 37 which are held in place by the clamping action of split bearing members 35. The sleeves 37 each have an annular flange 38 which engages the inner or adjacent ends of the split bearing members 35 and the sleeves 37 extend through the split bearings members 35 and have external threads 39 on the portions extending from the other ends of the split bearing members 35. The sleeves 37 have outwardly tapered bores 42 forming outer races for engaging ball bearings 43 supported in grooves 44 of inner races 45 which are sleeved on outer end portions 46 of barrel portions 47 and 48 of the main telescope 2. The outer end portions 46 are provided with external threads 49 on which are threaded the inner races 45. Longitudinal adjustment of the main telescope 2 is accomplished by coordinated assembly and tightening of the threaded portions of the respective sleeves 37 for centering the intersection of the main and cross telescopes 2 and 3 over the rotative axis of the spindle 5.

The respective outer end portions 46 of the barrel portions 47 and 48 each have flanges 52, one of the flanges being provided with the groove 53 in which is engaged an annular rib 54 on the adjacent sleeve 37 to form a seal. The other flange 52 has a portion of reduced size to receive a clamping ring 55 having a clamp screw 56. In the illustrated example, the clamp screw 56 is at a top or upper portion of the clamping ring 55 and extending from a bottom or lower portion of the clamping ring 55 is an arm 58 projecting downwardly therefrom and provided with a tangent screw 59 and a spring loading mechanism 60 which engage a lug 61 on the adjacent arm 7 and operate against the tangent screw to provide for slow motion angular adjustment of the optical axis of the telescope 3 for accurately positioning and retaining the telescope 3 with respect to rotation thereof about the axis of the trunnions 9 and 10.

The trunnions 9 and 10 includes means providing vertical adjustment of the main telescope 2 relative to the respective standard arms 7 and 8 and, in the illustrated example, the sleeves 37 of the split bearing members 35 include a lower sleeve 37' supported by a bushing block 41, such as of a rectangular shape, FIG. 12, and of a durable material such as brass or the like. The bushing block 41 is received within a complimentary shaped housing portion 41' in the upper portion of the respective arms 7 and 8 and an adjustment screw 51 extends upwardly and through an adjacent standard arm portion. The screw 51 is rotatably affixed at an upper end to the bushing block 41 to provide for movement of the bushing block and vertical adjustment of the main telescope 2 by first loosening the split bearing member fastening screws 35' rotating the vertical adjustment screw 51 in the desired direction, and then retightening the screws 35' to maintain the adjusted position.

The main telescope 2 is mounted in the spaced trunnions 9 and 10 for rotation about the axis of the trunnions and, in the illustrated example, has a barrel 50 with spaced barrel portions 47 and 48 thereof extending from an enlarged couple or head 63 which has a center precisely aligned with the vertical axis extending through the vertical spindle 5. Through bore 64 extend through the split barrels 47 and 48 and are coaxially aligned. Cross bores 65 extend through the couple or head 63 at a right angle to the through bores 64 to receive and precisely position the cross telescope 3 in perpendicular relationship to the main telescope 2. The main telescope 2 is preferably of unitary barrel construction whereby the barrel portions 47 and 48 combine to comprise a single barrel 50 or optically straight tube. The cross telescope 3 is also preferably of unitary barrel construction and includes a single barrel 66 having a through bore 67 therein and forming an optically straight tube. The bore 67 of the barrel 66 has an optical axis therethrough intersecting with the optical axis through the main telescope 2 and, in common with the optical axis of the main telescope 2, intersecting the axis of rotation of the standard 4 about the spindle 5.

Each of the telescopes 2 and 3 have an objective lens 11 mounted in one end thereof and an adjustable eyepiece 71 mounted in one end thereof and an adjustable eyepiece 71 carrying the eyepiece lenses 12 and arranged whereby movement of the eyepiece 71 will adjust the focus of the eyepiece lenses 12. The focusing lens 14 is suitably supported in a slide member 72 slidably mounted longitudinally of the respective telescope barrels intermediate the length thereof. The slide member 72 has a gear rack 73 operatively engaged by a gear pinion 74 mounted on a shaft 75 rotatably mounted in a bearing 76 and extending exteriorly of the barrel. A knob 77 is provided on the shaft 75 for turning the gear pinion 74 and moving the slide member 72 to move the focusing lens 14 to suitably focus the respective telescopes 2 and 3.

The slide member 72 is preferably in the form of a sleeve 78 movable in the respective bores 64 and 67 and is positioned whereby, when the focusing lens 14 is moved substantially to the end of its travel toward the eyepiece 71, the focusing lens and its mounting will not interfere with sighting through the telescope arranged at right angles to the subject telescope.

Arranged in the respective telescope barrels in spaced relation to the eyepieces 71 are the erector lenses 13 which are adjustably carried by an erector lens ring 80 with screws 81 arranged in the telescope barrel to adjust the axis of the lens 13. The erector lens 13 inverts the image transmitted through the erector lenses and the focusing lenses into a normal correct side up orientation.

In the illustrated example, the reticle 15 is carried by a ring 83 intermediate the erector lens assembly and the focusing lens 14, the reticle ring 83 being adjusted by screws 84 to center the reticle. The reticle may be cross hairs, filar lines, bi-filar lines, multiple bi-filar lines or, other suitable lines deposited on a glass optical plano-parallel relative to the line of sight through the lenses of the respective telescopes 2 and 3.

Screws 81 and 84 for the erector lens assembly and the reticle ring assembly have respective heads thereof received in an annular sleeve 85 having counterbores 86 positioned to receive the screw heads. A cover ring 87 is sleeved externally of the annular sleeve 85 and is removable for access to the screws 81 and 84. Separate annular sleeves 89 and 90 are respectively provided for the reticle mounting assembly screws 84 and the erector lens assembly mounting screws 81 for the main telescope 2. Each include counterbores 91 receiving heads of the respective screws 81 and 82. A cover ring 92 is sleeved over the annular sleeve 89 and a cover ring 93 of reduced diameter relative to the cover ring 92 extends over the annular sleeve 90 to provide dust protection and guard against inadvertent adjustment of the screws thereunder.

Preferably, both telescope barrels are provided with a tubular member 96 extending radially therefrom adjacent one barrel end. The barrel end may have the adjustable eyepiece 71 coaxially mounted thereto or may have illumnifying means such as a light source, bulb or the like arranged in the tubular member 96. In the latter situation, the inner end of the tubular member would be provided with a filter and collimating lens whereby, when the light source is activated rays of light will be projected into the telescope barrel between the eyepiece end of the barrel and the erector lens 13 and substantially transversely of the barrel. The cap 97, FIG. 11 may be used for covering the eyepiece 71 whether the eyepiece 71 is mounted coaxially with the telescope barrel or transversely thereto as described above. A prismatic mirror 99 is mounted on a support member 100 and is positioned whereby a line of sight through the tubular member 96, either from an eyepiece 71 or illumnifying means are reflected axially through the telescope barrel to sight therethrough or to project the reticle on an object at a distance from the telescope. The prismatic mirror 99 is shaped and of a type to permit a line of sight from an eyepiece 71 coaxial with the end of the barrel to travel therethrough and not distort the light rays in any manner.

An optical micrometer 101 is fitted coaxially to the objective end of the telescope barrel and includes a calibrated drum 102 operatively connected to an optical plano-parallel 103 for pivoting or inclining the optical plano-parallel 103 in response to rotation of the calibrated drum 102. Inclination of the plano-parallel 103 displaces the line of sight through the telescope and the amount of displacement is indicated by the calibrations on the drum 102 which correspond to linear dimensions. The optical micrometer 101 is secured on the barrel by a clamp screw assembly 105.

The optical transit square instrument 1 is used to establish a optical reference line parallel to co-planar with or co-linear with one axis of the article being worked upon. The optical transit square instrument 1 is arranged on a suitable support such as a tooling bar or stand and positioned whereby the vertical axis of the spindle 5 is substantially perpendicular to a desired line or plane relative to the object to be worked upon. A plane perpendicular to the reference plane can be swept while keeping one of the telescopes of the optical transit square instrument 1, such as the main telescope 2 sighted on the point, thereby affording the opportunity to continually cross-check the deviation from perpendicular of the swept plane with the reference plane. A cone emanating from the instrument can be swept to locate points therein. Using multiple instruments, a second plane can be swept parallel to the first swept plane whereby the second swept plane is also perpendicular to the reference line or plane whereby the multiple swept planes are in parallel relation. Multiple planes and cones are established regardless of the orientation of the instruments to gravity, or by the use of levelling vials (not shown), the levelling screws 20 can be adjusted until the levelling head 19 is level and thereby referenced to gravity.

Whether or not the reference line or plane is referenced to gravity, the optical transit square instrument 1 is rotated on the spindle 5 to align the main telescope 2 supported by the trunnions 9 and 10 with the target. The clamp screw assemblies 27 are tightened to keep the main telescope 2 pointed toward the target and the main telescope 2 rotated in the trunnions 9 and 10 about the optical axis thereof whereby the cross telescope 3 sweeps a plane perpendicular to the plane established by the main telescope 2. The main telescope 2 rotates on a target which remains centered on the reticle; this indicates that the optical square instrument is precisely positioned for perfect alignment with the target. For accurate sighting of the target, the main telescope 2 is focused by means of the focusing lens 14 on the target. Typical focal ranges employed by the telescopes of the optical transit square instrument 1 are, for example, 2 inches to infinity and permit focusing on very close and far objects within the field of view. Collimation is not required, although the main telescope 2 can have a collimation function by the addition of suitable illuminating means in conjunction with optical prisms, mirrors and the like (not shown).

With respect to the main telescope 2, the optical transit square instrument 1 provides a line of sight which is focusible upon discrete points or objects in a plane at a right angle to the spindle 5 whereby rotation of the main telescope 2 about the spindle 5 sweeps the plane without first defining the orientation of the plane to gravity. The reference plane swept by the main telescope 2 as the standard 4 rotates about the spindle 5 contains an infinite number of loci or points upon which the main telescope 2 is able to focus, as for measurement purposes. Perpendicular to the reference plane created by sweeping the main telescope 2 about the axis of the spindle 5 is a perpendicular plane also having an infinite number of loci, points or perpendicular planes therein upon which the cross telescope is focusible, again as for measuring purposes. Moreover, the cross telescope 3 is able to sweep a cone emanating from the couple or head 63 whereby a set sighting elevation of the cross telescope 3 is maintained by tightening the clamping screw 56 about the main telescope 2. The optical transit square instrument 1 has the ability to sweep a plane parallel to a plane on which the optical transit square is mounted without first defining the orientation of the first plane to gravity and then to sweep an infinite number of planes perpendicular to the plane parallel. Because either scope has the ability to focus upon points within the reference planes or lines, verification of instrument location is easily and quickly accomplished without repeated cross checking of the reference plane using collimation procedures employing auto collimation or other procedures using second telescopes spaced from a first telescope and the like.

The versatility of the exemplary optical square instrument 1 is shown in FIGS. 1 through 5. For purposes of illustration, the standard 4 is shown in an upright attitude wherein the spindle 5 is aligned vertically or perpendicular to an article such as a tooling bar thereunder. As described above, the spindle 5 need not be oriented vertically but may be in any orientation whether or not referenced to gravity whereby the optical transit square instrument 1 can create a plane with the main telescope 2 perpendicular to the spindle 5, a plane with the cross telescope 3 at a right angle to the plane swept by the main telescope 2, also a plane with the cross telescope coplanar with the plane swept by the main telescope, and a cone swept by the cross telescope 3 emanating from the juncture of the main and cross telescopes 2 and 3 and spaced above the spindle 5.

In the example of use shown in FIG. 1, the main telescope 2 is able to sweep a horizontal plane perpendicular to the axis of the spindle 5 connecting the standard 4 to the base 6. By moving the cross telescope 3 in up and down rotation, a plane is swept by rotation of the main telescope 2 about the rotational axis of the spindle 5. By tightening the clamp screws 56 to fix the cross telescope 3 at a relative elevation to the plane swept by the main telescope 2, a broad, downwardly extending cone is swept.

Figure 2:
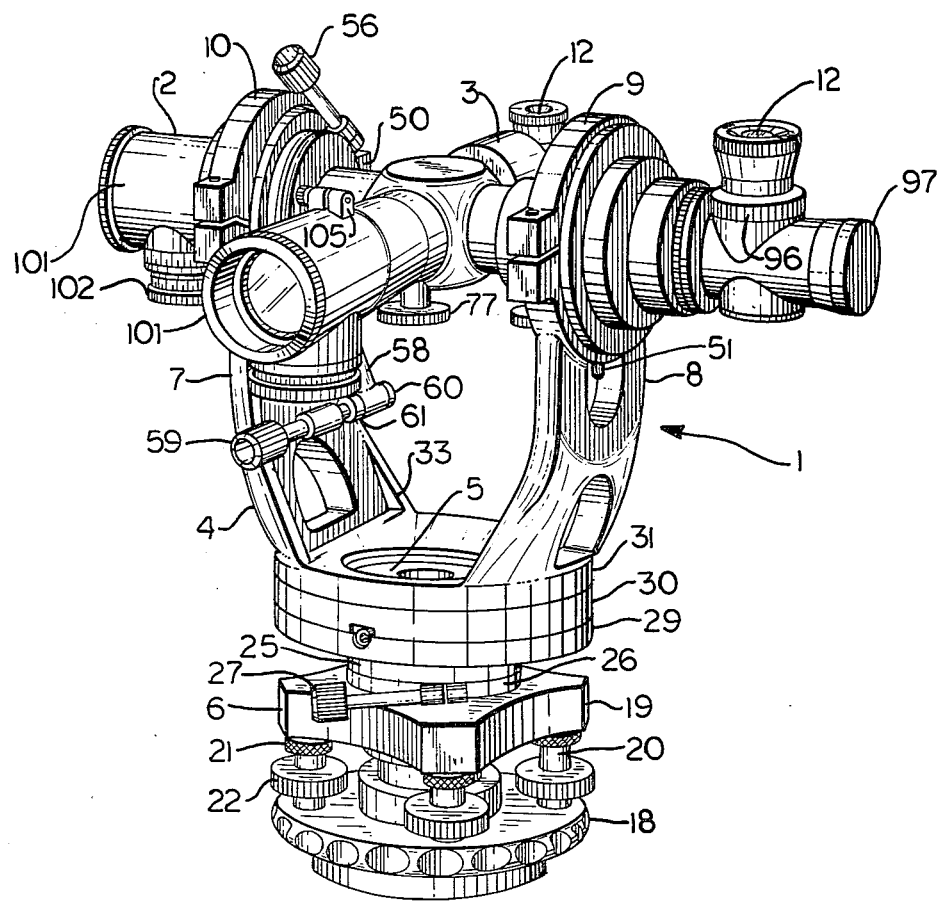
FIG. 2 is a perspective view of the instrument shown in FIG. 1 which has been rotated approximately 180° in the vertical plane and 180° in the horizontal plane from the orientation of the instrument shown in FIG. 1.

In the example of use shown in FIG. 2 both the main and cross telescopes 2 and 3 sweep the same horizontal plane which is established at a right angle to the axis of rotation about the spindle 5. Any rotational deviation of the spindle 5 is clearly seen as the two telescopes are swept through the plane for any deviation will result in nonalignment of the telescope cross-hairs on the target point as the telescopes are swept into viewing position. By loosening the clamp screw 56, the cross telescope can be rotated up and down to sweep a vertical plane.

Figure 3:
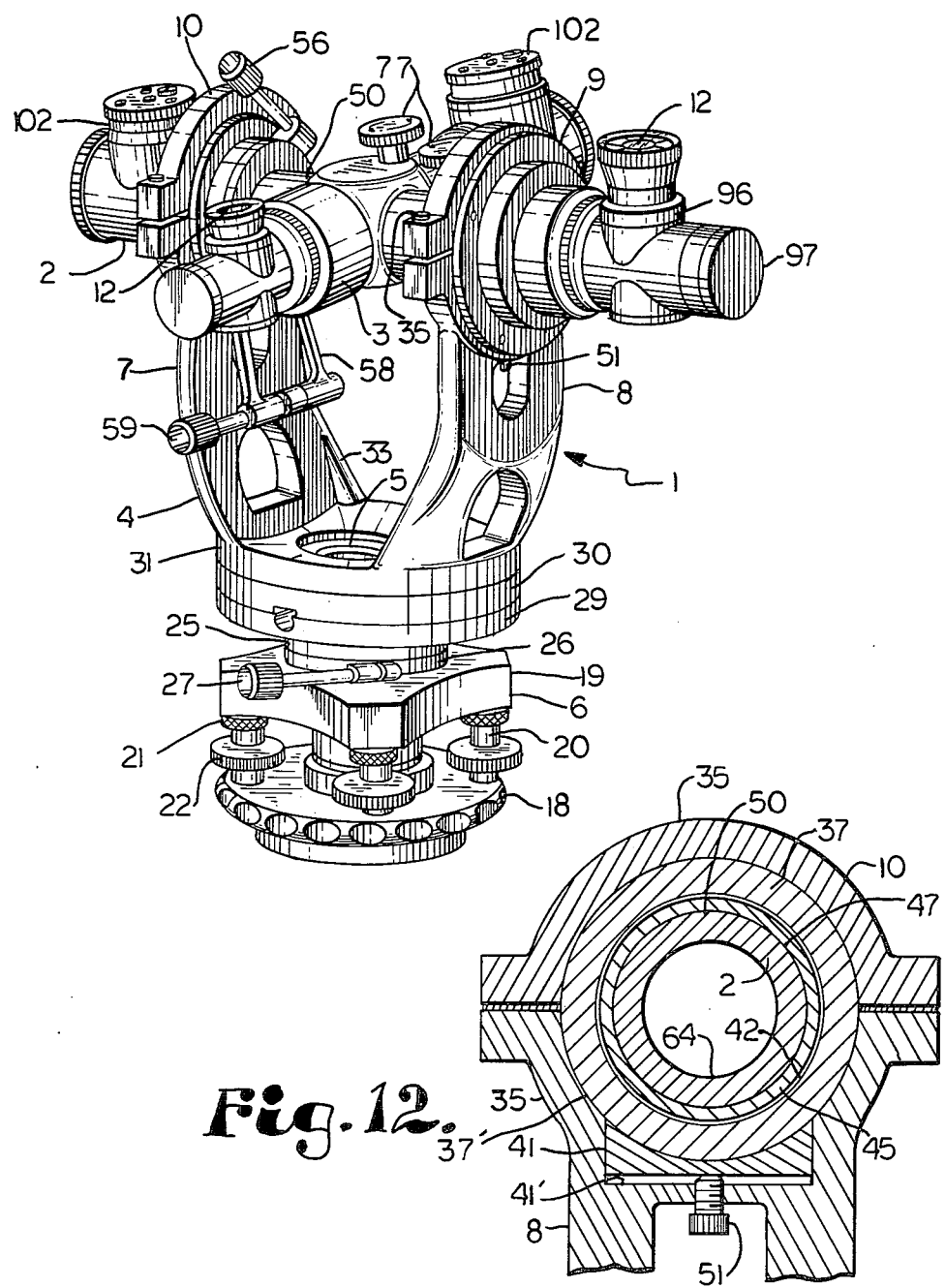
FIG. 3 is a perspective view of the instrument which has been rotated 180° in the vertical plane from the orientation shown in FIG. 2.

In FIG. 3 is shown an example of use wherein the main and cross telescopes 2 and 3 are maintained in a plane perpendicular to the spindle axis and in sweeping relationship thereto such as shown in FIG. 2 and the cross telescope 3 has been rotated about the optical axis of the main telescope 2 one hundred and eighty degrees, thereby sweeping a vertical plane in the process of rotation. Simultaneously, the main telescope 2 has been rotated about its optical axis, remaining aligned with the target point confirming the instrument position.

Figure 4:
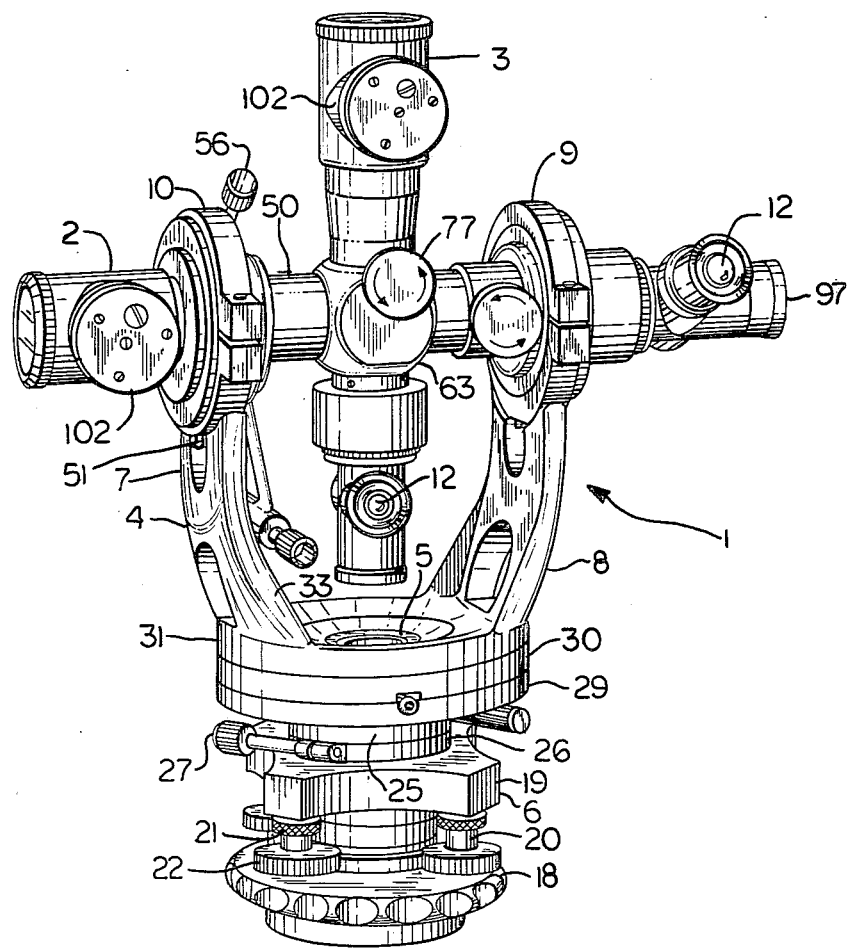
FIG. 4 is a perspective view of the instrument which has been rotated in the vertical plane approximately 90° from the orientation shown in FIG. 3.

In FIG. 4 is shown an example of use wherein the cross telescope 3 is pointed straight up and used to sight a target directly above the transit square instrument 1. To sight through the cross telescope 3 in this orientation, it is necessary to look through the eyepiece lens 12 which is mounted transversely of the barrel. The clamping screw 56 can be tightened to lock the cross telescope in position sighting the overhead target and the standard 4 rotated about the spindle 5. If the target is not directly overhead, the target will appear to wander or be displaced from the cross hairs during said rotation.

Figure 5:
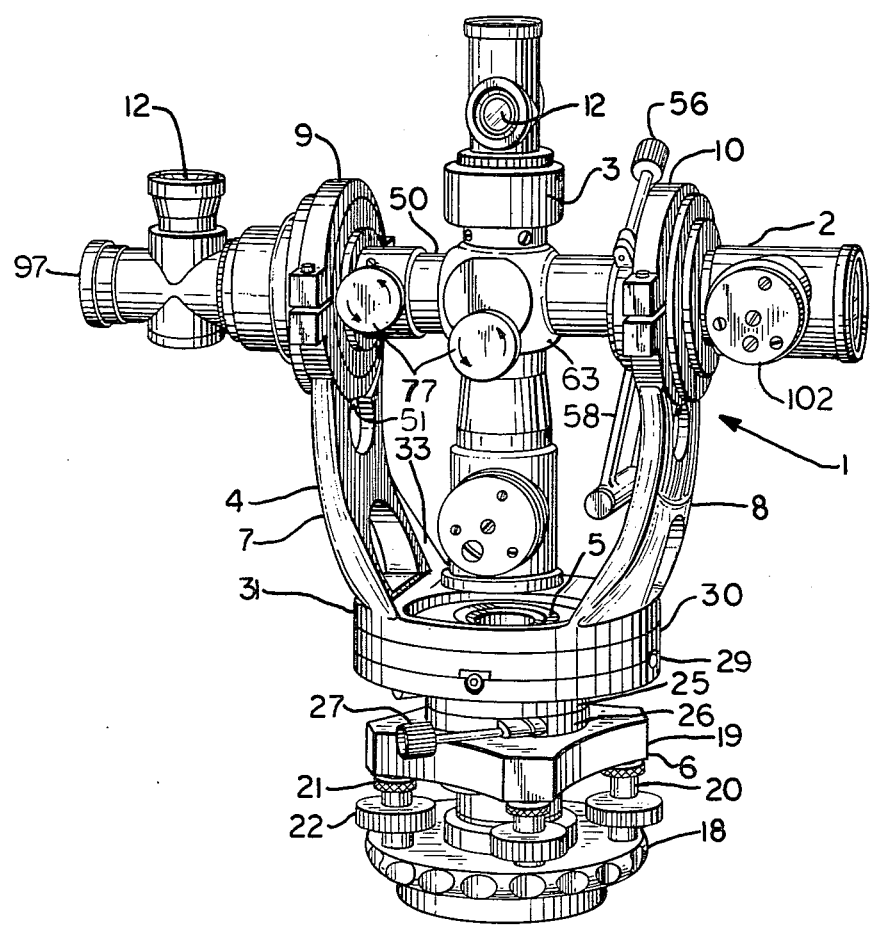
FIG. 5 is a perspective view of the instrument which has been rotated approximately 180° in the vertical plane and 180° in the horizontal plane from the orientation shown in FIG. 4.

A view wherein the cross telescope is rotated 180 degrees from the orientation thereof shown in FIG. 4 is shown in FIG. 5. The cross telescope 3 is pointed straight down and used to sight a target below the transit square 1 and positioned in line with a line of sight through the hollow spindle 5. The ability of the transit square instrument 1 to accomplish this orientation is an important aid in establishing planes or lines perpendicular to the spindle 5 of the instrument. As in the vertical orientation of the cross telescope shown in FIG. 4, the cross telescope is locked in position by the clamping ring 55 and screw 56 and the standard 4 is rotated relative to the base 6 about the spindle 5. Any deviation of the spindle 5 from perfect alignment to the target point is apparent if the target point wanders or drifts from the cross hairs as the standard 4 rotates.

Simultaneously with checking the alignment of the instrument to points above and below as shown in FIGS. 4 and 5, a plane, such as a horizontal plane, is swept which is at a right angle to the rotational axis of the spindle 5.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A precision optical transit square instrument for accurately determining lines and planes respectively perpendicular to reference lines and planes and comprising:
   (a) a support;
   (b) a standard having spaced arms and rotatably mounted on said support and having an axis of rotation;
   (c) a main telescope having a barrel with an optical axis and with aligned lenses therein for focusing upon objects in a line of sight thereof and positioned at different distances from said barrel;
   (d) bearings in said spaced arms and rotatably supporting trunnions receiving said main telescope and forming a mounting therefor for rotation about the optical axis of said main telescope, said main telescope being rotatable with said standard about the axis of rotation thereof to sweep a plane perpendicular to the axis of rotation of said standard and focusable upon objects therein; and
   (e) a cross telescope having a barrel with an optical axis and with aligned lenses therein for focusing upon objects in a line of sight thereof;
   (f) said cross telescope extending transversely between said arms and mounted perpendicularly to said main telescope with the respective optical axes thereof in intersecting relation at a point in line with the axis of rotation of said standard;
   (g) said cross telescope being movable with rotation of the main telescope about the optical axis thereof to sweep a plane perpendicular to the plane swept by the main telescope with the axis of rotation of said standard being in said plane swept by the cross telescope, sweep a cone emanating from the intersection point of said optical axes and the axis of rotation of said standard and to focus upon objects in a line of sight thereof.

2. The optical transit square instrument set forth in claim 1 including:
   (a) means in the mounting of said main telescope with said cross telescope mounted to said main telescope maintaining said point of intersection of the respective optical axes of said main telescope and said cross telescope situated in perfect alignment with the axis of rotation of said standard.

3. The optical transit square instrument set forth in claim 1 wherein:
   (a) the barrel of said main telescope and the barrel of said cross telescope respectively include an objective lens mounted at one end of each barrel, an eyepiece including a lens mounted at the other end of each barrel, a focusing lens intermediate the ends of the barrel, means for moving the focusing lens longitudinally of the barrel for adjusting the focus of each telescope, an erector lens supported intermediate the focusing lens and the eyepiece lens, and a reticle in each barrel intermediate the focusing lens and the erector lens.

4. The optical transit square instrument set forth in claim 1 including:
   (a) a spindle extending between said support and said standard whereby said standard revolves on said spindle in smooth, precise, wobble-free relationship; and
   (b) a clamping ring extending around said spindle between said support and said standard and operative to control relative rotational movement of said standard to said support.

5. The optical transit square instrument set forth in claim 1 wherein:
   (a) said support is mounted relative to a reference plane;
   (b) said support includes a socket member open for receipt of a mounting post therein, an upper levelling head and a plurality of adjustment screws therebetween for adjusting and setting said levelling head and said standard relative to said reference plane.

6. The optical transit square instrument set forth in claim 1 including:
   (a) a ring clamp extending around the barrel of said main telescope and connected to one of said arms for controlling rotation of said barrel relative to said arms;
   (b) said ring clamp having a clamping screw extending therefrom and operable to loosen and tighten said ring clamp around said barrel.

7. The optical transit square instrument set forth in claim 1 wherein:
   (a) the barrels of said main and cross telescopes respectively have an optical micrometer affixed to an end thereof and having an optical axis aligned with the optical axis of said barrel;
   (b) the optical micrometer has plano-parallel therein connected to a calibrated drum for inclination thereof whereby a line of sight through said optical micrometer is displaced with the amount of displacement being indicated by said calibrated drum.

8. A precision optical transit square instrument for accurately determining cones and respectively perpendicular lines and planes and comprising:
   (a) a main focusable telescope having a barrel with an optical axis and containing aligned lenses for focusing upon and viewing of objects in a line of sight thereof;
   (b) a support;
   (c) a standard having spaced arms and rotatably mounted on said support and having an axis of rotation;
   (d) bearings in said spaced arms and rotatably supporting trunnions receiving said main telescope and forming a mounting for rotation of said main telescope about the optical axis thereof;
   (e) means for adjusting the barrel of said main telescope longitudinally of said arms in said bearings and trunnions;
   (f) means for adjusting the barrel of said main telescope vertically of said arms;
   (g) said axis for rotation of said standard being perpendicular to the optical axis of the main telescope whereby the main telescope is rotatable with said standard about the axis of rotation to sweep a plane perpendicular to the axis of rotation of said standard and focusable upon objects therein; and
   (h) a cross telescope having a barrel with an optical axis and with aligned lenses therein for focusing upon objects in a line of sight thereof;

(i) said cross telescope mounted to said main telescope in intersecting relationship and having the respective optical axes of said main and cross telescopes intersecting perpendicularly at a point;

(j) said means for adjusting the barrel of said main telescopes longitudinally of said arms providing adjustment in a first direction to position the point of intersection of the optical axes of said main and cross telescopes in line with the axis of rotation of said standard;

(k) said means for adjusting the barrel of said main telescope vertically of said arms providing adjustment in a second direction in a plane perpendicular with said first direction to position the point of intersection of said main and cross telescopes perpendicular to the axis of rotation of said standard.

9. The instrument set forth in claim 8 wherein:
(a) said means for adjusting the barrel of said main telescope longitudinally of said arms includes a plurality of threaded annular portions in said bearings and trunnions;
(b) said threaded portions being coordinatingly and selectively positionable to control and maintain a longitudinal position of said main telescope barrel with respect to said bearings and trunnions.

10. The instrument set forth in claim 8 wherein:
(a) said means for adjusting the barrel of said main telescope vertically of said arms include a bushing member extending respectively between said trunnions said arms and an adjustment screw therebetween;
(b) said adjustment screw being operable to bear against said bushing member and move said bushing member relative to a respective said one of the arms of said standard and cause said trunnions to be adjusted vertically in said bearings and thereby move said barrel therewith.

11. A precision optical sighting instrument for determining cones and respectively perpendicular lines and planes and comprising:
(a) main and cross telescopes with respective optical axes and each having a barrel, an objective lens mounted at one end of each barrel, an eye piece including a lens mounted at the other end of each barrel and extending perpendicularly therefrom a focusing lens intermediate the ends of each barrel, means for moving each focusing lens longitudinally of each barrel for adjusting the focus of each telescope, an erector lens supported intermediate each focusing lens and eye piece lens, a reticle in each telescope barrel intermediate each focusing lens and erector lens and having an opening therethrough communicating with the interior of each barrel, a prismatic mirror in each barrel and aligned with the respective eyepiece of each barrel to direct a line of sight from the respective eyepiece substantially at a right angle and through the respective barrel;

(b) a support;
(c) an adjustable standard having spaced arms and means rotatably mounting said standard to said support for rotation about an axis;
(d) bearings in said spaced arms and rotatably supporting trunnions receiving said main telescope and forming a mounting therefor for rotation about the optical axis of said main telescope, said main telescope being rotatable with said standard to sweep a plane perpendicular to the axis of rotation of said standard and focusable upon objects therein;
(e) means for adjusting the barrel of said main telescope longitudinally of said arms and providing adjustment in a first direction and including a plurality of threaded annular portions in said bearings and trunnions, said threaded portions being coordinatingly and selectively positionable to control and maintain a selected longitudinal position of said main telescope barrel with respect to said bearings and trunnions;
(f) means for adjusting the barrel of said main telescope vertically of said arms and providing adjustment in a second direction in a plane perpendicular with said first direction and including respective bushing members in said trunnions and adjustment screw mechanisms operable to bear against said bushing members and adjustably move said barrel vertically in said bearings;
(g) the cross telescope extending perpendicularly between said arms and intersecting perpendicularly said main telescope with the respective optical axes thereof in intersecting relation at a point in line with the axis of rotation of said standard; said means for adjusting the barrel of the main telescope longitudinally and means for adjusting the barrel of the main telescope vertically operative to maintain the point of intersection in line with the axis of rotation.

* * * * *